(12) United States Patent
Kjær et al.

(10) Patent No.: US 10,669,990 B2
(45) Date of Patent: Jun. 2, 2020

(54) RAMPING POWER IN A WIND TURBINE USING GAIN SCHEDULING

(71) Applicant: VESTAS WIND SYSTEMS A/S, Aarhus N (DK)

(72) Inventors: Martin Ansbjerg Kjær, Harlev J (DK); Jesper Sandberg Thomsen, Hadsten (DK); Jacob Krogh Kristoffersen, Viby J (DK); Jacob Deleuran Grunnet, Tranbjerg J (DK); Eik Herbsleb, Odder (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 15/735,513

(22) PCT Filed: Jun. 9, 2016

(86) PCT No.: PCT/DK2016/050173
§ 371 (c)(1),
(2) Date: Dec. 11, 2017

(87) PCT Pub. No.: WO2016/198076
PCT Pub. Date: Dec. 15, 2016

(65) Prior Publication Data
US 2018/0156196 A1 Jun. 7, 2018

(30) Foreign Application Priority Data
Jun. 11, 2015 (DK) .................... 2015 70360

(51) Int. Cl.
*F03D 7/02* (2006.01)
(52) U.S. Cl.
CPC ........... *F03D 7/0284* (2013.01); *F03D 7/028* (2013.01); *F03D 7/0224* (2013.01);
(Continued)

(58) Field of Classification Search
CPC ....... F03D 7/0224; F03D 7/0284; F03D 7/028
See application file for complete search history.

(56) References Cited

U.S. PATENT DOCUMENTS

| | | | |
|---|---|---|---|
| 2003/0151259 A1* | 8/2003 | Feddersen | F03D 7/0224 290/44 |
| 2008/0206051 A1* | 8/2008 | Wakasa | F03D 7/0224 416/41 |

(Continued)

FOREIGN PATENT DOCUMENTS

| | | |
|---|---|---|
| CN | 102317622 A | 1/2012 |
| WO | 2015078478 A1 | 6/2015 |
| WO | 2016198076 A1 | 12/2016 |

OTHER PUBLICATIONS

Danish Patent and Trademark Office Search Report for Application PA 2015 70360 dated Jul. 5, 2016.
(Continued)

*Primary Examiner* — Sean Gugger
(74) *Attorney, Agent, or Firm* — Patterson + Sheridan, LLP

(57) ABSTRACT

The invention relates to a control system for a wind turbine. The wind turbine comprises a power generator configured to generate power dependent on a power reference and a pitch system configured to adjust the pitch of a blade of the wind turbine dependent on a pitch request. The control system comprises a controller configured to determine the pitch request dependent on an adjustable gain. A gain scheduler comprised by the control system is configured to set the adjustable gain to an increased gain value if a rate of change of the power reference, e.g. an external power reference, exceeds a threshold.

20 Claims, 6 Drawing Sheets

(52) U.S. Cl.
CPC ....... *F05B 2260/71* (2013.01); *F05B 2260/74* (2013.01); *F05B 2270/1033* (2013.01); *F05B 2270/309* (2013.01); *F05B 2270/335* (2013.01); *Y02E 10/723* (2013.01)

(56) References Cited

U.S. PATENT DOCUMENTS

| | | | | |
|---|---|---|---|---|
| 2011/0049903 | A1* | 3/2011 | Jorgensen | F03D 7/0224 290/55 |
| 2012/0091713 | A1* | 4/2012 | Egedal | F03D 7/0224 290/44 |
| 2012/0133138 | A1* | 5/2012 | Sorensen | F03D 7/028 290/44 |
| 2012/0139247 | A1* | 6/2012 | Krueger | F03D 7/0224 290/44 |
| 2012/0189443 | A1* | 7/2012 | Esbensen | F03D 7/00 416/1 |
| 2012/0306203 | A1* | 12/2012 | Drossel | F03D 7/0284 290/44 |
| 2014/0232198 | A1* | 8/2014 | Garcia | H02J 3/24 307/84 |
| 2014/0297052 | A1* | 10/2014 | Pineda Amo | F03D 7/042 700/287 |
| 2014/0306451 | A1* | 10/2014 | Abdur-Rahim | F03D 7/0224 290/44 |
| 2015/0078478 | A1 | 3/2015 | Rege et al. | |
| 2015/0132129 | A1* | 5/2015 | Atzler | F03D 7/0224 416/1 |
| 2015/0267686 | A1* | 9/2015 | Kjær | F03D 7/0224 290/44 |
| 2017/0152836 | A1* | 6/2017 | KJR | F03D 7/0224 |
| 2017/0234300 | A1* | 8/2017 | Brodsgaard | F03D 7/0224 416/1 |
| 2017/0241405 | A1* | 8/2017 | Kruger | F03D 7/028 |
| 2018/0171977 | A1* | 6/2018 | KJR | F03D 7/0276 |

OTHER PUBLICATIONS

PCT Written Opinion of the International Searching Authority for Application No. PCT/DK2016/050173 dated Jun. 9, 2016.
PCT International Search Report for Application No. PCT/DK2016/050173 dated Jun. 9, 2016.
SIPO of the People's Repubiic of China Notification of First Office Action dated Dec. 27, 2018 for Appiication No. 201680040978.8.

* cited by examiner

RAMPING POWER IN A WIND TURBINE USING GAIN SCHEDULING

FIELD OF THE INVENTION

The invention relates to a method for controlling a wind turbine, particularly to a method for controlling a wind turbine during power ramping.

BACKGROUND OF THE INVENTION

Wind turbines may be operated in a de-rated mode where the wind turbine is controlled to produce an amount of power which is lower than the amount of power that can be produced considering the available wind power. The purpose of operating the wind turbine in a de-rated mode may be to establish a power reserve that can be released if needed.

The de-rated wind turbine may be requested to ramp production up very fast to full production, e.g. in order to meet an increased power demand at the grid. The ramping demand may be in the form of an external power reference from a grid operator or other external source.

The fast ramping of power up to full production may lead to various undesired effects such as undesired variations in the produced power.

Accordingly, there is a need to improve the wind turbine's capability to handle power ramping demands.

US2012139247A1 discloses a wind power plant, including a generator driven by a rotor for generating electrical power and a controller that includes a pitch module for adjusting a pitch angle of blades of the rotor. The controller has an input for a required power reserve and determines a target pitch angle depending on an operating point of the wind power plant. A secondary pitch controller is also provided, which includes a detector for available power and a dynamic offset module. Input signals for the available reserve power determined by the detector, the required reserve power and the generated electrical power are applied to the dynamic offset module, which is designed to determine a value for a pitch angle offset. An activation element varies the target pitch angle by the pitch angle offset.

SUMMARY OF THE INVENTION

It is an object of the invention to improve the control of a wind turbine in relation to handling power ramping demands, particularly to improve the wind turbine's capability to handle external power references which demands high ramping rates.

It is a further object of the invention to reduce undesired effects caused by fast ramping of power up to full production. Such undesired effects may include undesired reduction in generator speed or generated power.

It may a further object of the invention to reduce structural loads of the wind turbine due to power ramping demands.

In a first aspect of the invention there is provided a method for controlling a wind turbine comprising the steps of
- controlling production of electric power dependent on a power reference,
- controlling a pitch of a blade of the wind turbine using a pitch request, where the pitch request is amplified by an adjustable gain,
- setting the adjustable gain to an increased gain value if a rate of change of the power reference exceeds a threshold.

The method for controlling a wind turbine may be used in a situation where the power production is increased or ramped up dependent on an increasing power reference. During ramping the pitch is controlled in order to adjust the power taken in by the rotor of the wind turbine so that the power taken in corresponds to the generated power. Due to dynamics the control system, the pitch may not be adjusted sufficiently fast. Advantageously, by increasing the gain for high rate of changes of the power reference, the dynamic capabilities of the control system may be improved so that the pitch may be adjusted faster with the effect that wind turbine is capable of tracking fast increases in the power reference.

According to an embodiment the method comprises increasing the power production dependent on the increasing power reference, where the power production is increased from an initial power which is lower than or equal to an available wind power. Accordingly, the wind turbine may be operated in a de-rated mode and at a point in time the wind turbine is requested to increase power production, possibly up to the available wind power. The request to increase power may be invoked by the power reference that is ramped up.

According to an embodiment the method comprises increasing power production from the initial power P0 to a finial power P1 which is lower than or equal a rated power Prated or a maximum power of the wind turbine. The final power P1 may correspond to the available wind power which may be lower or equal to the rated power.

According to an embodiment, the initial power P0 may also be a result of a low voltage event, which can occur when the utility grid experiences a fault where the grid voltage drop from a first level and to a second lower level. Embodiments of the present invention may be used after the termination of the low voltage event to ramp back the voltage to the final power P1 of normal operation. The initial power P0 is in this situation the resulting voltage level of the turbine upon termination of the low voltage event, and the final power P1 is the desired voltage level at which the turbine should resume to.

According to an embodiment the method comprises increasing the adjustable gain dependent on the rate of change of the power reference. Accordingly, the gain may be set to an increased fixed gain or the gain may be gradually increased, e.g. step-wise or continuously, dependent on the rate of change of the power reference. In other words, the gain may be adaptively changed dependent on the rate of change of the power reference.

According to an embodiment the method comprises setting the adjustable gain according to a gain scheme defining gain values as a function of the rate of change of the power reference.

For example, the gain scheme may define a minimum gain for rate of changes of the power reference below the threshold.

Alternatively or additionally, the gain scheme may comprise increasing gain functions for rate of changes of the power reference above the threshold.

Alternatively or additionally, the gain scheme may define gain values for positive and negative rate of changes of the power reference. For example, the gain scheme may define a maximum gain value for the positive rate of changes of the power reference above an upper positive threshold and/or for the negative rate of changes of the power reference below an upper negative threshold.

According to an embodiment the method comprises determining the pitch request dependent on a difference between a generator speed reference and a measured generator speed. For example, the wind turbine may comprise a controller, e.g. a partial load controller or other control system, configured to determine the pitch for adjusting the blades dependent on a speed error.

According to an embodiment the method comprises controlling the pitch until the pitch reaches a pitch reference determined dependent on a wind speed. For example, the pitch reference may be a minimal pitch which provides an optimal energy intake by the rotor, e.g. an optimum pitch determined dependent on a wind speed and generator speed.

According to an embodiment the method comprises
controlling the production of electric power dependent on a difference between an operational reference and a measured operational parameter, and
controlling the pitch dependent on the pitch reference, after the pitch has reached the pitch reference.

Accordingly, after the pitch has reached the pitch reference a configuration of a control system may be changed so that the pitch is determined based on a pitch reference, e.g. according to a full load mode.

A second aspect of the invention relates to a control system for a wind turbine, where the wind turbine comprises a power generator configured to generate power dependent on a power reference, and a pitch system configured to adjust the pitch of a blade of the wind turbine dependent on a pitch request, the control system comprises
a controller configured to determine the pitch request dependent on an adjustable gain, and
a gain scheduler configured to set the adjustable gain to an increased gain value if a rate of change of the power reference exceeds a threshold.

A third aspect of the invention relates to a wind turbine comprising a control system according to the second aspect.

A fourth aspect of the invention relates to a computer program product directly loadable into an internal memory of a digital computer, the computer program product comprising software code portions for performing the steps of the method according to the first aspect when the computer program product is run on the computer.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
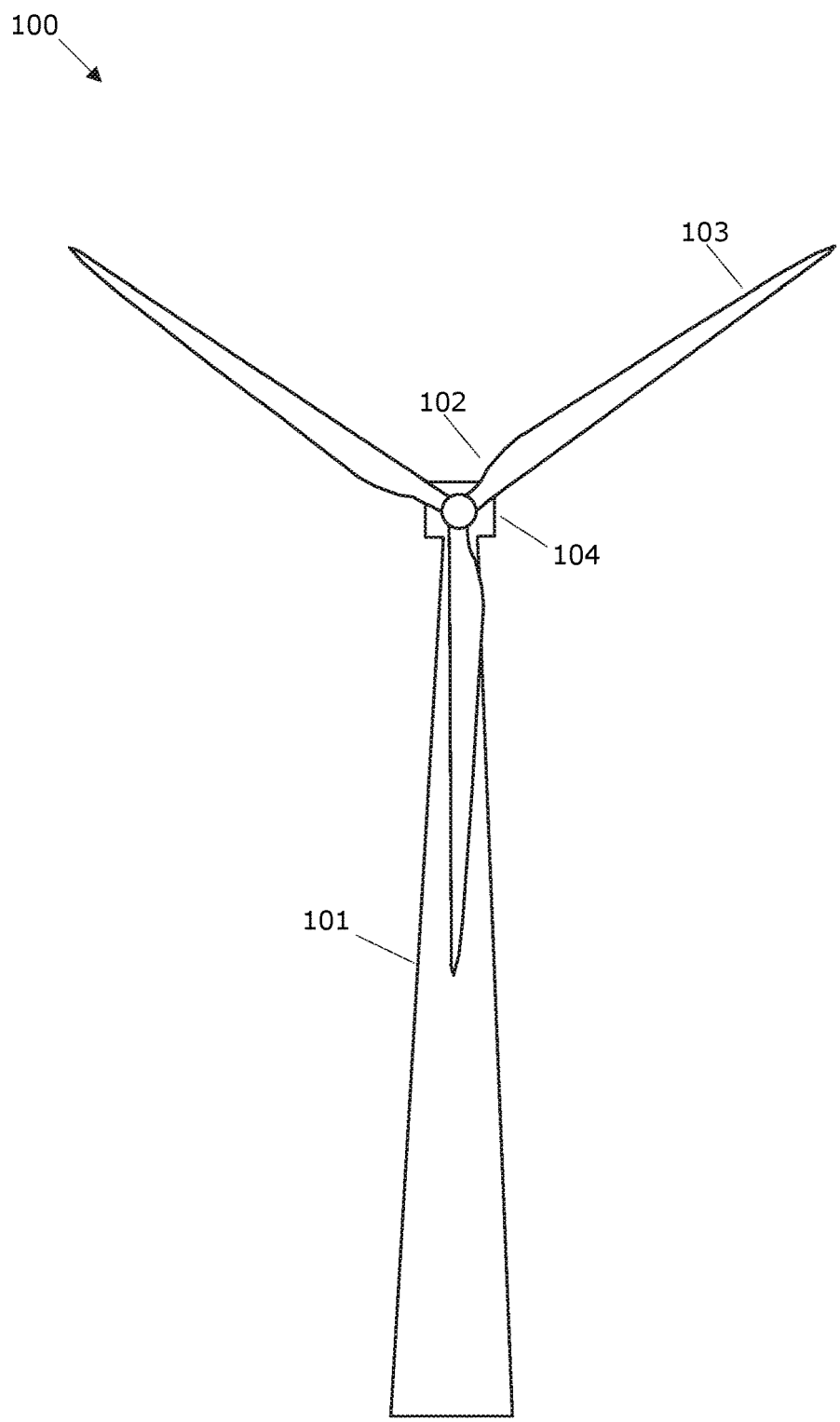
FIG. 1 shows a wind turbine.

FIG. 1 shows a wind turbine 100 (WTG) comprising a tower 101 and a rotor 102 with at least one rotor blade 103, such as three blades. The rotor is connected to a nacelle 104 which is mounted on top of the tower 101 and being adapted to drive a generator situated inside the nacelle. The rotor 102 is rotatable by action of the wind. The wind induced rotational energy of the rotor blades 103 is transferred via a shaft to the generator. Thus, the wind turbine 100 is capable of converting kinetic energy of the wind into mechanical energy by means of the rotor blades and, subsequently, into electric power by means of the generator. The generator may include a power converter for converting the generator AC power into a DC power and a power inverter for converting the DC power into an AC power to be injected into a utility grid. The generator is controllable to produce a power corresponding to a power request.

The blades 103 can be pitched in order to alter the aerodynamic properties of the blades, e.g. in order to maximise uptake of the wind energy. The blades are pitched by a pitch system which includes actuators for pitching the blades dependent on a pitch request.

Figure 2:
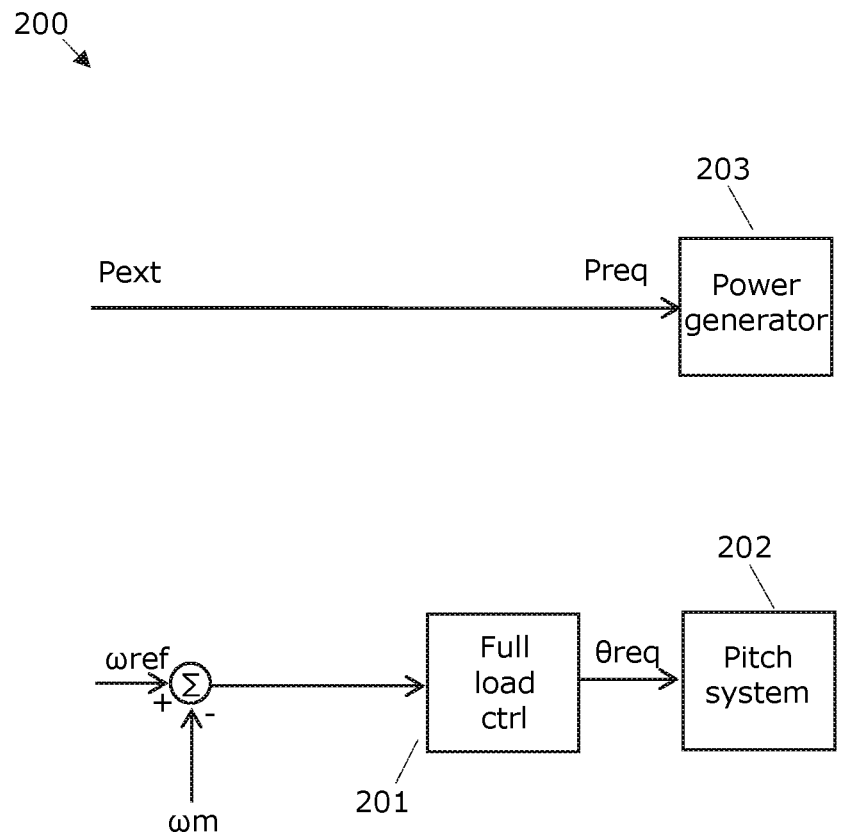
FIG. 2 shows a control system of the wind turbine where the control system is in a full load state,
FIG. 3 show curves illustrating generated power, generator speed and available wind power for a wind turbine operated in a reduced power mode.

FIG. 2 shows an example of a configuration 200 of a wind turbine in a situation where a control system of the wind turbine is configured according to a full load state.

The control system of the wind turbine comprises a full load controller 201 which is activated in the full load state to determine the pitch request θreq for the pitch system 202. During full load the pitch request is determined dependent on a difference between a generator speed reference ωref and a measured generator speed ωm.

The control system of the wind turbine also comprises a partial load controller which is activated in a partial load state to determine the power request Preq for the power generator. During partial load the power request is determined dependent on a difference between the generator speed reference ωref and the measured generator speed ωm.

The partial load controller is not shown in the full load configuration 200 since during full load the generator request Preq is determined based on an external power reference Pext and, therefore, the partial load controller may be inactivated during full load control. For example, the generator request Preq may be set equal to the external power reference Pext. The external power reference Pext may be provided by a grid operator or other source such as power plant controller communicating with a plurality of wind turbines, e.g. power plant controller configured to compensate grid frequency changes.

The generator request Preq is supplied to the power generator 203. The power generator may contain a generator controller which receives the generator request Preq and controls the generator to produce the requested power Preq. Accordingly, the power generator may be defined as a power generator system containing the generator controller, the generator, power converters/inverters and other units and which is configured to produce power according to the requested amount.

The pitch request θreq is supplied to the pitch system 202 which performs pitch adjustment of the blades 103. The pitch system may contain a pitch controller with receives the pitch request θreq and controls the pitch actuators to set the pitch to the requested pitch.

The partial load state may be selected if the wind speed is not high enough to enable generation of the nominal or rated electrical power from the generator. In this state the pitch θ and the generator speed are controlled to optimize aerodynamic efficiency of the wind turbine 100. Therefore, the pitch request θreq may be set to an optimum pitch reference θopt which maximises the aerodynamic efficiency of the rotor. The generator speed ωr may be controlled to extract as much power as possible by tracking the desired generator speed ωref. In the partial load state the generator speed ωr is controlled via the power request Preq which affects generator torque.

Accordingly, in partial load, the partial load controller calculates the power request Preq that minimises the difference between the generator speed reference ωref and the measured generator speed ωm.

The full load state may be selected if the wind speed v is high enough to enable generation of a rated electrical power. Therefore, the generator speed and generator power may be controlled to achieve a desired power production, e.g. a rated power or a reduced power. The power request Preq is set to the desired power production. The generator speed reference ωref may be determined dependent on the desired power production and possibly limited to a maximum rated speed. In the full load state the generator speed ωr is controlled via the pitch request θreq.

The rated power level is the power level that the wind turbine is designed generate at or above rated wind speed. In some circumstances the wind turbine may be operated to generate a maximum power which is higher than the rated power.

Accordingly, in full load, the full load controller 204 calculates the pitch request θreq that minimises the difference between the generator speed reference ωref and the measured generator speed ωm.

It is noted that the generator speed ωr and the rotor speed are linked by the gear ratio of the gear connecting the rotor with the generator shaft. Accordingly, the generator speed reference ωref and may equivalently be set as a rotor speed reference and a measured rotor speed may equivalently be used instead of a measured generator speed. It is also noted that the power generator 203 may equivalently be controlled by means of a torque request instead of the power request Preq. Accordingly, it is understood that the power request Preq may be a power or torque set point for the power generator 203.

The wind turbine may be operated in a de-rated mode in the full load configuration 200, i.e. in a mode where the power request Preq is set to a reduced power reference. The de-rated mode is also referred to as a reduced power mode. The reduced power reference may be any power which is lower than the rated power of the wind turbine. In the de-rated power mode the pitch is controlled according to a generator speed reference ωref which may be de-rated, i.e. reduced, or not depending on the design of the wind turbine. The generator speed reference ωref may be set from a pre-defined power-speed relation.

Thus, the de-rated power mode refers to a situation where the wind turbine is operated to produce a reduced amount of power, i.e. a situation where the wind turbine is controlled to produce an amount of power which is lower than power that can be produced with the available wind power.

For example, the wind turbine may be operated in a de-rated mode in order to establish a power reserve that can be released quickly e.g. if a problem with the grid arises. Accordingly, at demand, the wind turbine has to ramp the power very fast back to full production.

It is noted that the configuration 200 is only an example and that a wind turbine may be configured in other ways to achieve control of pitch and power and to achieve de-rated power production.

Figure 3:
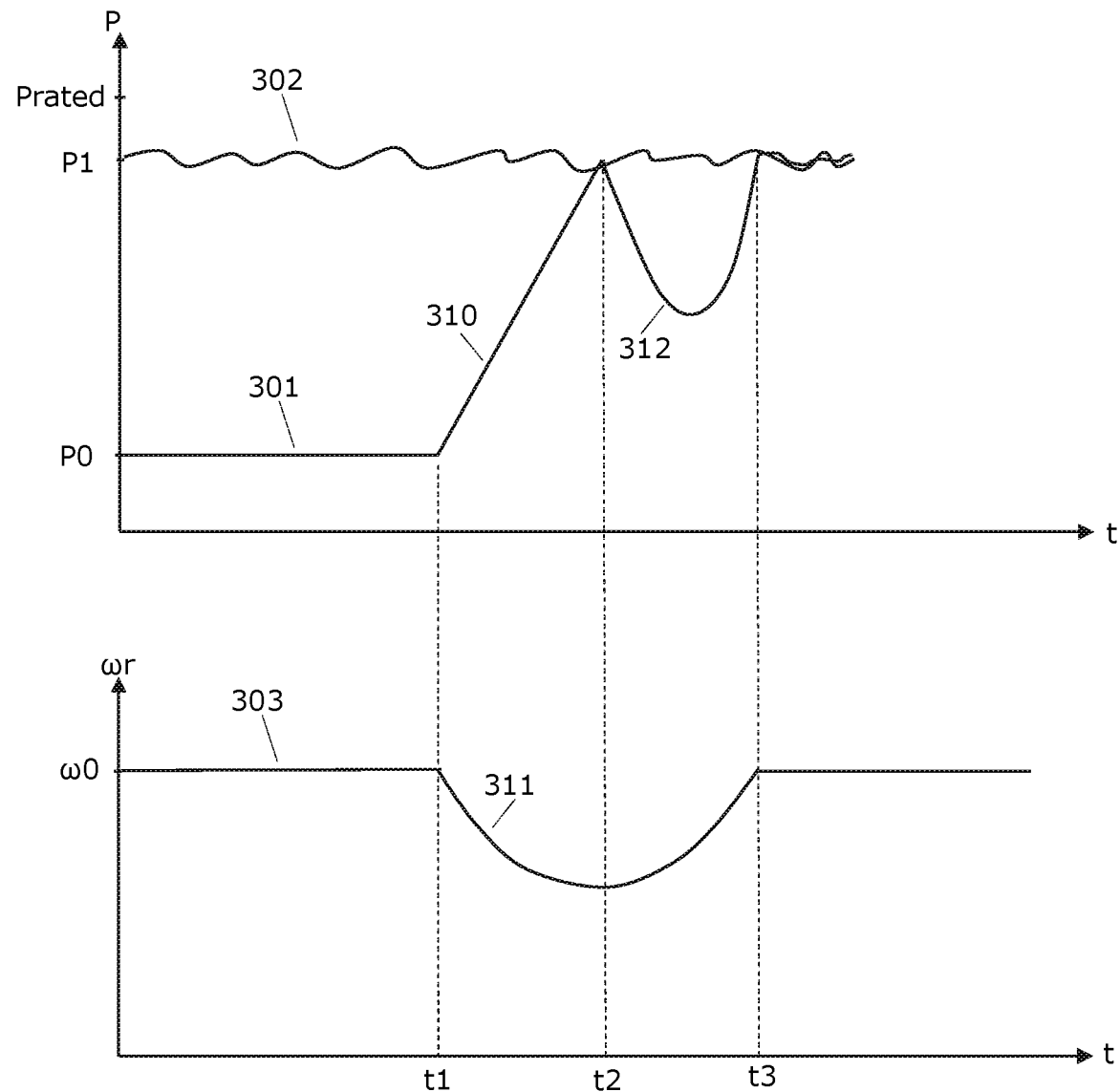

FIG. 3 illustrates generated power 301 and generator speed 303 for a wind turbine operated in the reduced power mode. Curve 302 illustrates the available wind power. The reduced power has the value P0 and the associated generator speed has the value ω0.

At t1 the wind turbine receives a demand, e.g. in the form of an external power reference Pext, to ramp to full power production, i.e. the power production which is possible with the available wind power. In this case, the available wind power is slightly below the rated power Prated. Due to dynamics of the full load controller 201 and pitch system 202, e.g. the loop-time of the full load controller 201, the blades are not pitched in sufficiently fast to increase extraction of wind energy corresponding to the increasing power generation given by the power ramp 310. Since the blades are not pitched fast enough to increase extraction of wind power at a sufficiently high rate the generator speed reduces 311 during the ramping.

At time t2 the generated power 301 approaches the available wind power and, therefore, the control system of the wind turbine switches to the partial load state. When the generated power 301 comes close to the available wind power 302, the pitch request θreq approaches an optimum pitch value θopt. θopt is a predetermined pitch angle which provides an optimum aerodynamic efficiency for a given wind speed and generator speed.

Accordingly, a comparison of the pitch request θreq and the optimum pitch value θopt may be used as a condition for determining when to switch to the partial load state.

In the partial load state, the partial load controller controls the generator speed ωr by means of a power request Preq determined so as to minimize the speed error between a measured generator speed ωm and the generator speed reference ωref. The speed error caused by the generator speed reduction 311 causes a power reduction 312 in order to increase the generator speed, i.e. the partial load controller reduces the power request due to the speed error.

At time t3 the generator speed ωr is back at the generator speed reference ωref and the generated power 301 corresponds to the available wind power 302.

The power reduction 312 is unacceptable for the grid and therefore should be avoided.

Figure 4:
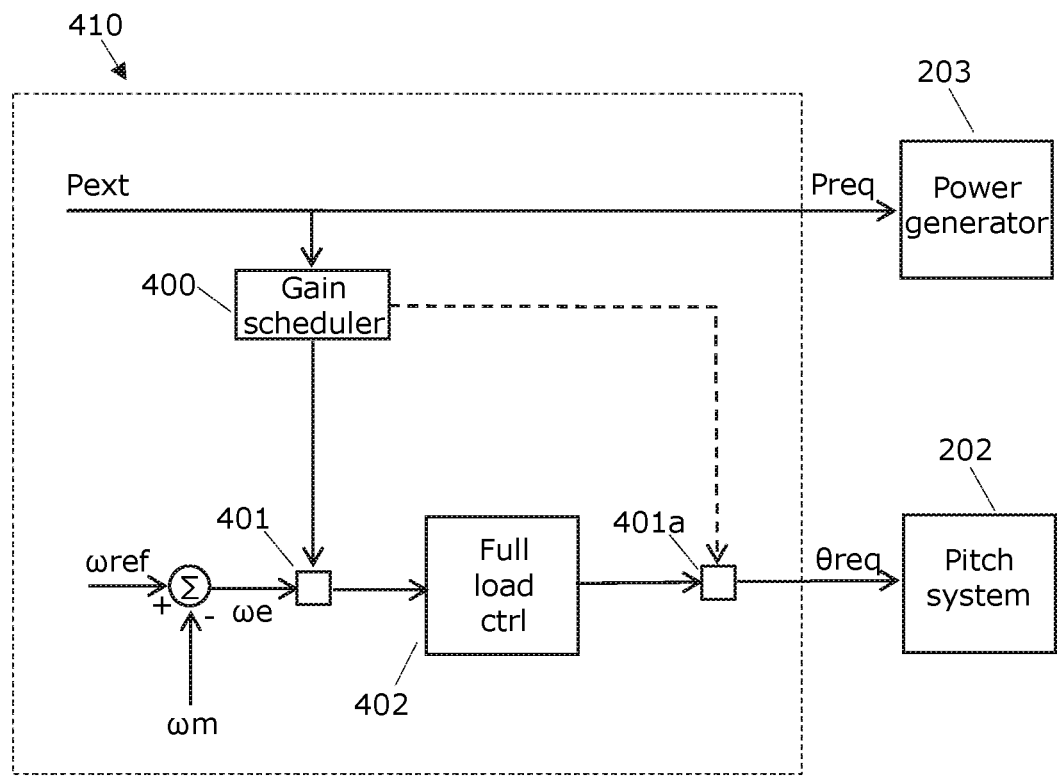
FIG. 4 shows a wind turbine control system configured with a gain scheduler.

FIG. 4 shows an example of a control system 410 for a wind turbine. Elements in FIG. 4 which are of the same or similar type or have a similar function as an element in FIG. 2 are provided with the same reference numbers for convenience and are, therefore, not described in connection with FIG. 4.

The control system 410 comprises a controller 402 configured to determine the pitch request θreq, i.e. a pitch control signal, dependent on an adjustable gain 401, 401a. The controller 402 may be a full load controller 201 as described in connection with FIG. 2. Therefore, the controller 402 may be configured to determine the pitch request θreq dependent on a difference between a generator speed reference ωref and a measured generator speed ωm. For example, the controller, e.g. a PI controller, may determine the pitch request through a control algorithm so as to minimize the speed error ωe between the measured generator speed ωm and the generator speed reference ωref.

Either the speed error ωe or the output from the controller 402 may be amplified by an adjustable gain 401, 401a. By means of the amplification, the pitch request θreq is amplified by the adjustable gain. When the pitch request θreq is amplified by a gain greater than one, the pitch system 202 will react faster to changes in the speed error ωe.

The control system 410 further comprises a gain scheduler 400 configured to set the adjustable gain to an increased gain value if the rate of change of the power reference exceeds a threshold. For example, the gain scheduler 400 may be configured to set the adjustable gain to a gain value greater than one if the rate of change of the power reference exceeds the threshold.

Accordingly, the control system 410 provides a method for controlling a wind turbine 100 which includes controlling production of electric power 301 dependent on a power reference Pext, controlling a pitch of a blade of the wind turbine using a pitch request θreq wherein the pitch request θreq is amplified by an adjustable gain 401, 401a, and setting the adjustable gain to an increased gain value if a rate of change of the power reference Pext exceeds a threshold.

The power reference Pext may in some situations, before a ramping request, have a value which is greater than the available wind power 302. For example, the power reference may be set to a default value, e.g. the rated power of the wind turbine. In a situation where the power reference Pext has a default value being greater than the available wind power 302 and the wind turbine is requested to ramp power down from the produced amount—which corresponds to the available amount of power—to a reduced amount of power, the power reference will initially jump from the default value to the available amount of power. For example, Pext could be set to the default value 3 MW and the available power could be 2 MW. In that case, the power reference Pext will show a step from 3 MW to 2 MW. The step in the power reference Pext has a large rate of change and could therefore lead to an undesired or incorrect increase in the gain value.

Accordingly, in an embodiment, the gain scheduler is configured to set the adjustable gain to an increased gain value if a rate of change of the power reference exceeds a threshold, where the step of setting the adjustable gain to an increased gain value is only possible when the power reference is below the available wind power 302. For example, the rate of change may only be determined for values of the power reference below the available wind power 302, and/or changes in the gain is only set when the power reference is below the available wind power 302.

The adjustable gain may be set to a fixed increased gain value if the rate of change ΔP exceeds a threshold. Alternatively, the adjustable gain may be increased, e.g. linearly or stepwise, dependent on the rate of change of the power reference for rate of changes ΔP above the threshold.

It is noted that a wind turbine may be configured with other control systems than the control system 410, which other control systems also include an adjustable gain between speed error and pitch adjustment that can be set to an increased gain dependent on a rate of change of the power reference Pext. For example, the control system 410 could be a control system which does not include specific partial and full load controllers and a switch mechanism to switch between the controllers, but which includes a controller capable of controlling both pitch and power without switching between dedicated controllers and which includes an adjustable gain between speed error and pitch adjustment, i.e. a gain scheduler configured according to an embodiment of the invention.

Figure 5A:
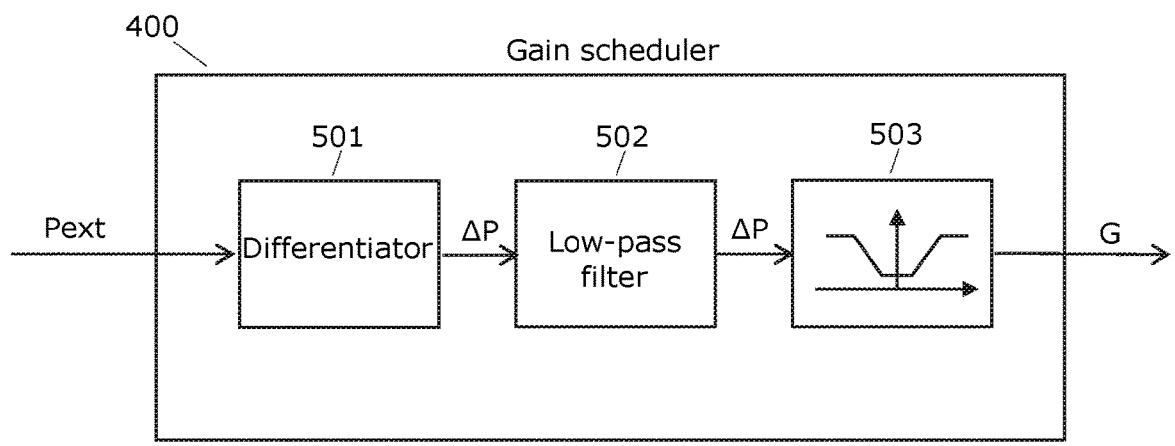
FIG. 5A shows an example of a gain scheduler.

FIG. 5A shows an example of a gain scheduler 400 which comprises a differentiator 501 which determines a rate of change of the external power reference Pext, a low-pass filter 502 which removes transients and provides an averaging effect, and a gain scheme 503 which determines the adjustable gain G dependent on the value of the rate of change of the external power reference Pext. The differentiator 501—or as mentioned above, the gain scheduler 400—may be configured to determine the rate of change for power references Pext below the available wind power 302.

The adjustable gain G may be set according to a gain scheme defining gain values G as a function of the rate of change ΔP of the power reference. For example, the gain scheme may be implemented as a mathematical expression or a look-up table.

Figure 5B:
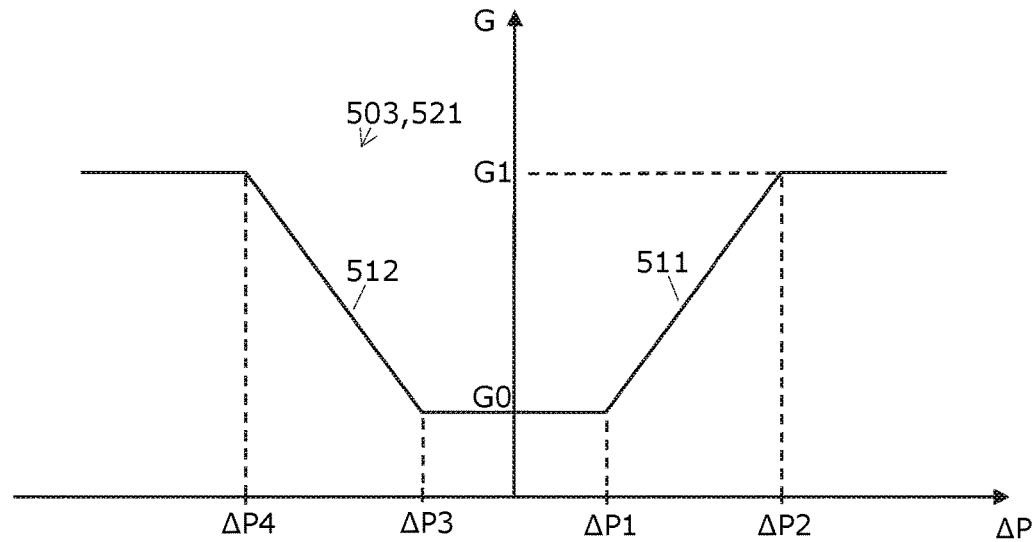
FIG. 5B shows an example of a gain scheme used in a gain scheduler.

FIG. 5B shows an example of a gain scheme 503 defined as a curve 521 being a function of the rate of change ΔP of the power reference Pext. The curve 521 could equally be defined as a look-up table, a function, a mathematical expression or other scheme. The gain scheme may define a suitable minimum value G0, e.g. a minimum gain G0 of one, for rate of changes ΔP below the threshold ΔP1. The gain scheme 503 may define gain values G for positive and/or negative rate of changes ΔP, i.e. for increasing and/or decreasing power ramping. Accordingly, the gain scheme may define a minimum gain G0 for positive rate of changes ΔP below the threshold ΔP1 and/or for negative rate of changes ΔP above the threshold ΔP3.

The gain scheme 502 may comprise increasing gain curves or functions 511, 512 for rate of changes ΔP above the threshold ΔP1. For a gain scheme 503 defined for positive and/or negative rate of changes ΔP, the gain scheme 503 may comprise increasing gain curves 511, 512 for positive rate of changes ΔP above the threshold ΔP1 and/or for negative rate of changes ΔP below the threshold ΔP3. The gain curves 511, 512 may have the same or different slopes. The increasing gain curves or functions 511, 512 may be defined as linearly, non-linearly or step-wise increasing curves or functions.

For example, the gain curves or functions 511, 512 may be defined to increase linearly, non-linearly or step-wise for positive rate of changes ΔP between the lower threshold ΔP1 and an upper positive rate threshold ΔP2 and/or for negative rate of changes ΔP between the lower threshold ΔP3 and an upper negative threshold ΔP4.

The gain scheme may define a maximum gain value G1 for positive rate of changes ΔP above the upper positive threshold ΔP2. Additionally or alternatively, the gain scheme may define a maximum value for negative rate of changes ΔP below the upper negative threshold ΔP4 which may be equal to G1 or different from G1.

The absolute value of ΔP3 may be equal to ΔP1 or they may be different. Similarly the absolute value of ΔP4 may be equal to ΔP2 or they may be different. For example, the absolute value of ΔP4 may be larger than to ΔP2 in order to establish a lower slope of the increasing gain function 512 for decreasing power ramps. In this case the maximum gain value at ΔP4 may be equal to the maximum gain value at ΔP2.

Figure 6:
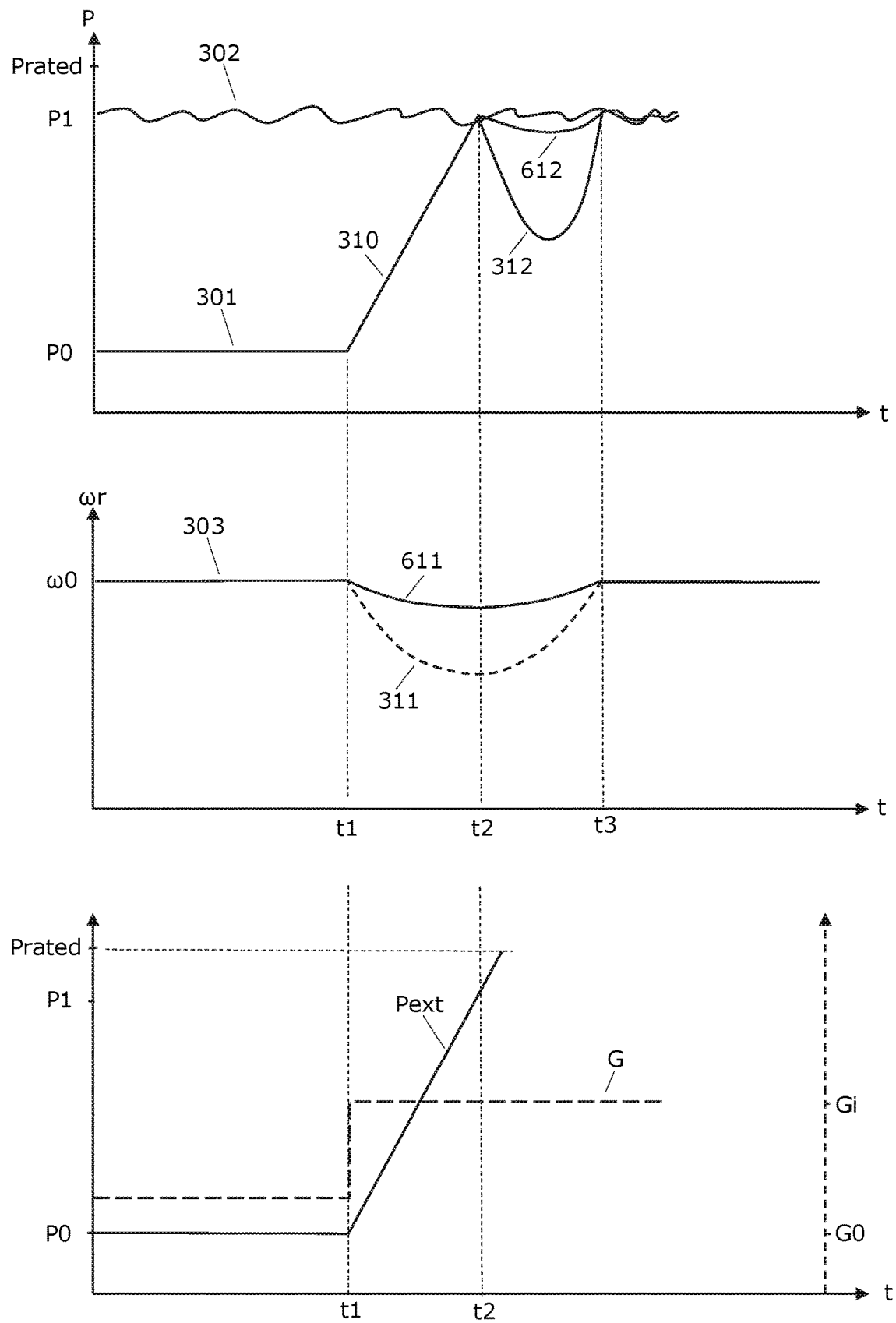
FIG. 6 shows curves that illustrate reduction in variations in produced power and generator speed in case of power ramping due to use of gain scheduling where the gain is determined dependent on the rate of change of the power ramp demand.

FIG. 6 illustrates generated power 301 and generator speed 303 in a situation similar to the situation in FIG. 3. Accordingly, elements (curves, details of the coordinate system) in FIG. 6 which has the same or similar function or meaning as an element in FIG. 3 are provided with the same reference numbers for convenience and are, therefore, not described in connection with FIG. 6.

FIG. 6 additionally shows the external power reference Pext. In the example, the power reference Pext increases beyond the available wind power 302. The requested power Preq may be equal to the external power reference Pext and may have the same slope as the external power reference Pext.

It is noted that the generated power 301, 310 follows the power request Preq, possibly within some tolerances, at least as long as the available wind power is high enough to enable production of the requested power.

Accordingly, FIG. 6 illustrates a method for controlling a wind turbine where the power production 301 is increased dependent on an increasing power reference, i.e. the external power reference Pext or the power request Preq. The power production is increased from an initial power P0 which is lower than or equal to the available wind power 302. The power production 301 may be increased to a finial power P1, e.g. a final power corresponding to the available power 302, where the final power is lower than or equal to a rated power Prated or a maximum power of the wind turbine.

Since the rate of change of the increasing power reference Pext exceeds a threshold (a power rate threshold), the adjustable gain G is increased from the nominal value G0 to an increased gain value Gi. Accordingly, after time t1, the pitch of the blades are controlled using the increased gain Gi.

At t1 the wind turbine is requested to ramp to full power production. Due to the increased gain Gi, the blades are pitched faster as compared to the situation where the gain remained equal to G0. As a consequence, the blades are pitched faster, so that the rotor's extraction of wind power is increased at a higher rate so that a possible reduction in generator speed 611 is smaller than the reduction 311 achieved in the situation where the gain G of the controller 201 is not modified.

At time t2 the generated power 301 approaches the available wind power and, therefore, the control system of the wind turbine switches to the partial load state. The switching may be conditioned on a comparison of the measured pitch and a pitch reference as described above.

The speed error between the measured generator speed 303 and the generator speed reference ωref causes a power reduction 612 in order to increase the generator speed up to the generator speed reference ωref. As illustrated in FIG. 6, the power reduction 612 is much smaller than the power reduction 312 since the speed error accumulated during ramping has been reduced due to the increased gain.

At time t3 the generator speed ωr is back at the generator speed reference ωref and the generated power 301 corresponds to the available wind power 302.

Even though a power reduction 612 may still be present, the reduction is smaller compared with the previous situation and may, therefore, be acceptable for the grid.

After time t3, when the ramping has been completed the gain G may be set to G0 again.

In order to ensure that the increased gain remains at the increased value for a given period of time after the power has reached the available power 302, the gain scheduler 400 may comprise a unit for holding the gain at the increase value for a period of time, e.g. until t3 when the ramping has been completed. For example, the unit may be an asymmetric filter. This ensures that the dynamic performance (i.e. the improved dynamic performance due to the increased gain) of the control system 410 is maintained for a desired period of time. For example, in situations where the rate of change of the power reference is reduced, e.g. to zero, at some time after t2, the increased gain is maintained.

The pitch of the blades may be controlled in the de-rated full load state until the pitch request θreq approaches the optimum pitch value θopt. Accordingly, the method for controlling a wind turbine may include controlling the pitch until the pitch reaches a pitch reference determined dependent on a wind speed and possibly dependent on the rotor speed, i.e. dependent on the tip-speed-ratio such as the optimum pitch value θopt.

In other words the pitch of the blades may be controlled in the de-rated full load state as long as the pitch is not constrained by an optimal power intake, i.e. a constraint set in terms of an optimum pitch reference θopt.

After the pitch has reached the pitch reference the wind turbine may be controlled in a partial load state by controlling the production of electric power dependent on a difference between an operational reference and a measured operational parameter, e.g. dependent on the difference between the generator speed reference ωref and the measured generator speed ωm. In the partial load state the pitch is controlled dependent on the pitch reference, e.g. the optimum pitch value θopt.

Embodiments of invention can be implemented by means of electronic hardware, software, firmware or any combination of these. Software implemented embodiments or features thereof may be arranged to run on one or more data processors and/or digital signal processors. Software is understood as a computer program or computer program product which may be stored/distributed on a suitable computer-readable medium, such as an optical storage medium or a solid-state medium supplied together with or as part of other hardware, but may also be distributed in other forms, such as via the Internet or other wired or wireless telecommunication systems. Accordingly, the computer-readable medium may be a non-transitory medium. Accordingly, the computer program comprises software code portions for performing the steps according to embodiments of the invention when the computer program product is run/executed by a computer or by a distributed computer system.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for controlling a wind turbine, the method comprising:

controlling, while power generation of the wind turbine is controlled according to a first power reference, a pitch of a blade of the wind turbine using a first gain value of an adjustable gain applied to a pitch request, wherein the first gain value is applied for one or more values of a rate of change of the power generation that are less than a threshold rate value;

receiving a second power reference;

determining, while the power generation is controlled according to the second power reference, that the rate of change of the power generation exceeds the threshold rate value; and applying, responsive to the determination, a second gain value of the adjustable gain to the pitch request, wherein the second gain value is greater than the first gain value.

2. The method according to claim 1,
wherein the first power reference corresponds to an initial power level that is less than or equal to an available wind power, and
wherein the second power reference corresponds to a final power level that is greater than the initial power level.

3. The method according to claim 2, wherein the final power level is less than or equal to a rated power level or a maximum power level of the wind turbine.

4. The method according to claim 1, further comprising:
selecting the second gain value of the adjustable gain dependent on the rate of change when the power generation is controlled according to the second power reference.

5. The method according to claim 1, wherein the second gain value is selected according to a gain scheme defining gain values as a function of the rate of change.

6. The method according to claim 5, wherein the first gain value is a minimum gain value for values of the rate of change less than the threshold rate value.

7. The method according to claim 5, wherein the gain scheme further comprises increasing gain functions for values of the rate of change exceeding the threshold rate value.

8. The method according to claim 5, wherein the gain scheme further defines gain values for positive values and negative values of the rate of change.

9. The method according to claim 8, wherein the gain scheme further defines a maximum gain value for one or both of the positive values of the rate of change that exceed an upper positive threshold, and the negative values of the rate of change that exceed an upper negative threshold.

10. The method according to claim 1, further comprising:
determining the pitch request dependent on a difference between a generator speed reference and a measured generator speed.

11. The method according to claim 1, further comprising:
controlling the pitch according to the pitch request until the pitch reaches a pitch reference determined dependent on a wind speed.

12. The method according to claim 11, further comprising:
controlling the power generation dependent on a difference between an operational reference and a measured operational parameter; and
controlling the pitch dependent on the pitch reference after the pitch has reached the pitch reference.

13. The method according to claim 5, wherein the gain scheme further defines gain values only for increasing values of the rate of change.

14. The method according to claim 5, wherein the gain scheme further defines gain values by a non-linear relationship having different slopes only for positive values of the rate of change.

15. The method of claim 1, wherein the first gain value is applied for a range of values of the rate of change that are less than the threshold rate value.

16. The method of claim 15, wherein the range of values includes a zero value of the rate of change.

17. The method of claim 11, wherein the pitch reference corresponds to an optimum aerodynamic efficiency for the wind speed.

18. The method of claim 1, wherein the threshold rate value is selected such that exceeding the threshold rate value indicates that ramping the power generation to the second power reference will cause an undesired reduction in one or both of a generator speed and the power generation.

19. A control system for a wind turbine comprising a power generator that generates power dependent on a power reference, and a pitch system that adjusts a pitch of a blade of the wind turbine dependent on a pitch request, the control system comprising:
a gain scheduler defining gain values of an adjustable gain referenced to a rate of change of the generated power, wherein the gain values comprise:
at least a first gain value applied for values of the rate of change that are less than a threshold rate value; and
at least a second gain value applied for values of the rate of change that exceed the threshold rate value; and
a controller configured to determine the pitch request dependent on the adjustable gain.

20. A computer program product directly loadable into an internal memory of a digital computer, the computer program product comprising executable software code that when executed by one or more computer processors performs an operation for controlling a wind turbine comprising:
controlling, while power generation of the wind turbine is controlled according to a first power reference, a pitch of a blade of the wind turbine using a first gain value of an adjustable gain applied to a pitch request, wherein the first gain value is applied for one or more values of a rate of change of the power generation that are less than a threshold rate value;
determining, while the power generation is controlled according to a second power reference, that the rate of change of the power generation exceeds the threshold rate value; and
applying, responsive to the determination, a second gain value of the adjustable pain to the pitch request, wherein the second gain value is greater than the first gain value.

* * * * *